Aug. 2, 1960 A. A. MACDONALD 2,947,859

AUTOMATIC CONTROL OF COUPLING BETWEEN INPUT TUNED CIRCUITS TO VARY ATTENUATION AND SELECTIVITY

Filed Aug. 11, 1955

INVENTOR.
Angus A. Macdonald
BY
Mueller & Aichele
Attys.

United States Patent Office 2,947,859

Patented Aug. 2, 1960

2,947,859

AUTOMATIC CONTROL OF COUPLING BETWEEN INPUT TUNED CIRCUITS TO VARY ATTENUATION AND SELECTIVITY

Angus A. Macdonald, Hinsdale, Ill., assignor to Motorola, Inc., Chicago, Ill., a corporation of Illinois Filed Aug. 11, 1955, Ser. No. 527,785

7 Claims. (Cl. 250—20)

Figures 1, 2, 3:
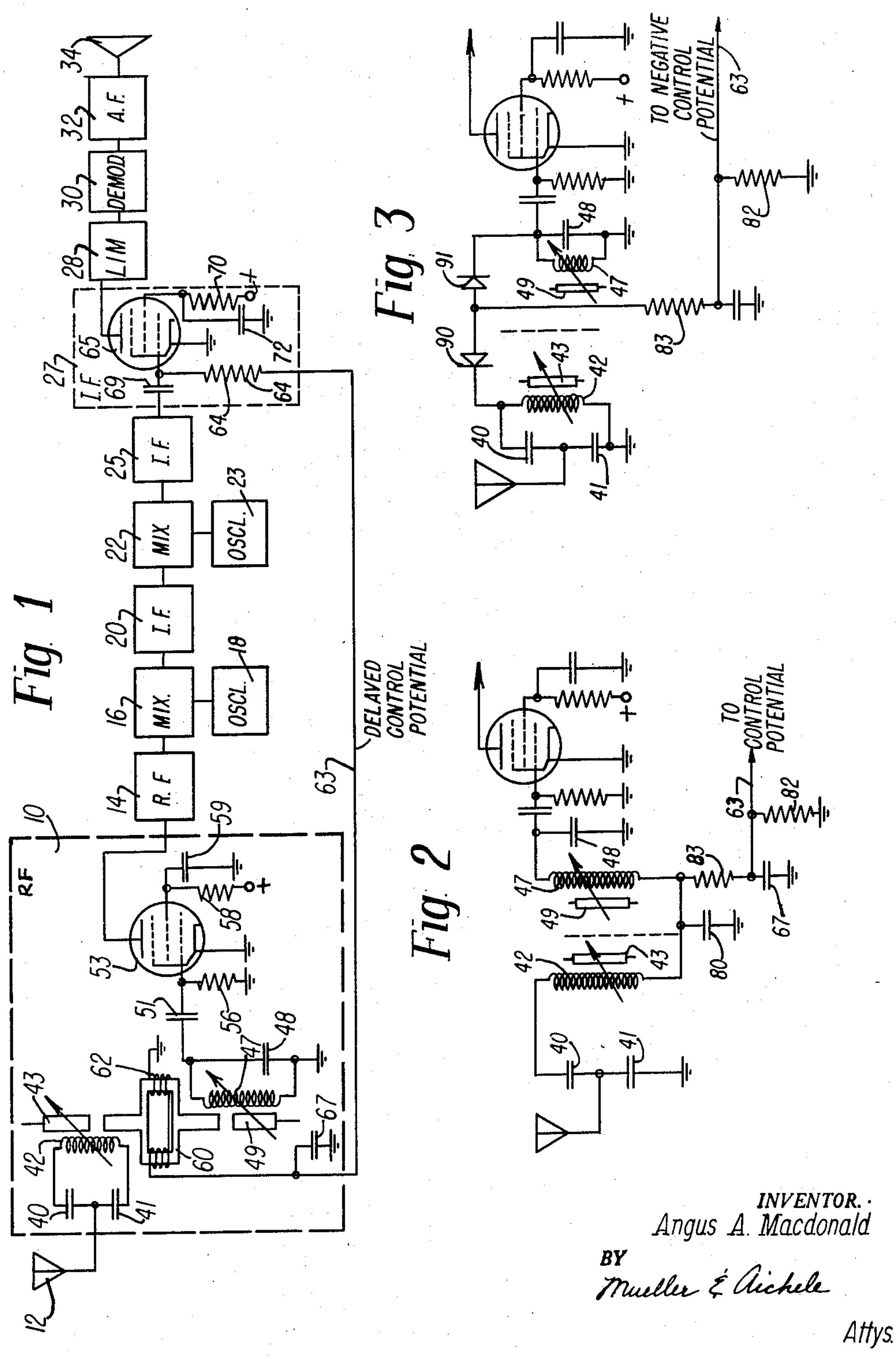

This invention relates to wave signal radio communications systems, and more particularly to apparatus for controlling the intermodulation of adjacent channel signals in receivers of such systems.

It is known in the communication art that a strong received signal oftentimes intermodulates with another signal in certain stages of a radio receiver. Thus the first tuned stage in a frequency modulation communication receiver may not provide sufficient selectivity to prevent intermodulation at certain levels of signal inputs and with certain frequency spacing of adjacent channel signals. The problem of such signal interference can become particularly acute in mobile communications systems where a receiver unit may, on some occasions be in strong signal areas, and on other occasions in weaker signal areas. Some adjustment in the equipment may be desired or even necessary in order to insure reception of weaker signals as well as stronger signals under different adjacent channel conditions.

Accordingly, it is an object of this invention to provide a simple and efficient automatic system to minimize intermodulation in a communication receiver.

Another object of the invention is to provide improved reception of closely spaced signals of various strengths in a frequency modulation communication receiver.

Still another object of the invention is to increase the selectivity and attenuation of a signal tuning circuit in a communication receiver according to the strength of a received signal, for improving the adjacent channel selectivity of the receiver and thereby reducing the tendency for intermodulation interference.

A feature of the invention is the provision of a receiver including a pair of tuned circuits intercoupled by a variable coupling unit which is responsive to a control related to the received signal strength for reducing the coupling and increasing signal selectivity at high signal levels.

Another feature is the provision of a pair of tuned circuits each including an inductance with a ferromagnetic core, with the cores being coupled together at substantially critical coupling by a saturable ferromagnetic unit. The unit includes a core with a winding connected to a direct current source which is variable with the signal strength for saturating this core at high signal strength to decrease the coupling and increase the circuit Q, or quality factor, and to thereby reduce intermodulation of the desired signal and adjacent channel signals.

Still another feature of the invention is the provision of a pair of tuned circuits intercoupled by a voltage sensitive capacitor connected to a control signal source for varying the coupling between the tuned circuits according to the strength of the signal translated thereby. The tuned circuits may also be intercoupled by diodes with a bias on such diodes varied by the signal strength for regulating coupling and selectivity of the tuned circuits.

Further objects, features and the attending advantages thereof will be apparent upon consideration of the following description when taken in conjunction with the accompanying drawing in which:

Fig. 1 is a schematic and block diagram of a radio receiver incorporating the invention, Fig. 2 is a diagram of a portion of a receiver incorporating a modified form of the invention, and Fig. 3 is a schematic diagram illustrating a further embodiment of the invention.

This invention comprises an automatic control system for a communication receiver to provide increased selectivity and reduced coupling of the input circuits when signals above a certain strength are received. It finds particular use in mobile radio communication receivers, which must often be adapted to receive both weak and strong signals in a spectrum of closely spaced signals, in order to reduce the tendency for intermodulation therein. The system includes two or more tuned circuits in the receiver input system which circuits are intercoupled by a variable unit responsive to a control signal for regulating the amount of coupling between the tuned circuits. The reduced coupling increases the selectivity of the tuned circuits to reduce the tendency for intermodulation in the receiving equipment. In the preferred form a saturable ferromagnetic member includes a core spaced from the cores in an inductance of the tuned circuits. The coupling may be varied from critical coupling to much looser coupling by application of a direct current to the winding of the ferromagnetic unit to control the saturation of the core thereof. Such direct current can be obtained by rectifying a portion of the received signal and supplying it to the winding thus varying the attenuation and selection of the signal according to its strength. The change in coupling may also be provided by a voltage sensitive capacitor responsive to the control signal for varying the coupling between the tuned circuits. Also a pair of conducting diodes biased by the control signal may be used to vary the coupling between the tuned circuits.

The receiver shown in Fig. 1 includes a first radio frequency amplifier 10 to which the received signal is applied from antenna 12, with the amplifier 10 selecting and amplifying the received signal. The signal is then applied to a further radio frequency amplifier 14 which may include any desired number of stages and which is coupled to the mixer circuit 16 where the signal is heterodyned with a signal from oscillator 18 and applied to the intermediate frequency amplifier 20. A second mixer circuit 22 may be provided for heterodyning the signal with a signal from oscillator 23 to produce a still lower intermediate frequency signal which is applied to intermediate frequency amplifier 25. Amplifier 25 may include any number of stages, the last one of which is coupled to the final intermediate frequency amplifier 27 which feeds the limiter circuit 28. The signal is then applied to the demodulator 30 where the intelligence is recovered, and after further amplification in audio amplifier 32, the signal is applied to loudspeaker 34 or other reproducing device for translating the received signal. The operation of the receiver as briefly described thus far is known in the art and may be seen to be that of a double conversion frequency modulation radio receiver, although the invention may be used in other types of equipment as is apparent from the following description.

Considering now amplifier 10 in greater detail, it may be seen that the antenna 12 is coupled through capacitors 40 and 41 to inductance coil 42 which is tuned by ferromagnetic core or slug 43. Elements 40—43 comprise a first tuned circuit resonant at the carrier frequency of the desired signal. A second tuned circuit including inductance coil 47 shunted by capacitor 48 and tuned by slug 49 is also tuned to the frequency of the desired signal. The second tuned circuit elements 47, 48 are coupled through capacitor 51 to the control grid of valve 53 which amplifies the received a signal. A D.C. path to ground for the control grid of valve 53 is provided by resistor 56 and the cathode of this valve is grounded. Resistor 58 is a screen dropping resistor for valve 53 and capacitor 59 comprises a screen bypass therefor. The received signal is then coupled from the anode of valve 53 to the further radio frequency amplifier circuit 14.

For coupling the first and second tuned input circuits, a variable coupling unit in the form of a saturable reactor device is provided. This unit includes a core 60 and a coil thereon for controlling the saturation of the core. The core 60 is disposed adjacent the coils 42, 47 and in air spaced relation from slugs 43, 49 of these respective coils. It is contemplated that the first tuned circuit comprising components 40—43 and the second tuned circuit comprising components 47—49 may be in critical coupling relation through the coupling provided by core 60 when the core is not saturated. The coil winding 62 on core 60 is connected from ground through line 63 to grid leak resistor 64 in the intermediate frequency amplifier 27. Capacitor 67 shunting coil winding 62 provides a signal bypass for the winding so that only D.C. will be applied to this winding.

Valve 65 in circuit 27, coupled to amplifier 25 through capacitor 69, includes a grounded cathode and an anode coupled to limiter 28. Valve 65 also has a screen grid to which a positive potential is applied through resistor 70 and which is bypassed to ground by means of capacitor 72. It is contemplated that circuit 27 be constructed so that at signal strengths above a certain selected level the control grid of valve 65 draws current, and this current flows through resistor 64 and winding 62. Thus when a received signal rises above the certain level, a current will flow through winding 62 which is proportional to the signal strength so that the core 60 saturates thus tending to decouple coils 42, 47 and reducing the signal transfer between these coils which are not otherwise coupled to one another. Since core 60 is air spaced from slugs 43, 49 saturation of these slugs will be prevented so as not to detune the first and second tuned circuits.

It may be seen that as the tuned circuits are decoupled the respective Q's thereof will be appreciably increased and rejection of undesired signals in channels adjacent to that of the desired signal will be increased both due to the improved selectivity and the attenuation provided by the decoupling of the tuned circuits. With the application of direct current to winding 62 being delayed somewhat, that is being developed and applied to this winding only at signals above a predetermined level, optimum coupling to valve 53 will be had at the lower signal levels where such is needed. However, at high input signal levels the described control system will regulate the input to the first radio frequency amplifier 10.

In the embodiment shown in Fig. 2 the parts corresponding to those of Fig. 1 are designated the same. The first tuned circuit comprising elements 40—43 is series coupled across the voltage sensitive capacitor 80, and the second tuned circuit comprising the elements 47, 49 is also series connected across capacitor 80. Coils 42, 47 of these circuits are shielded from one another. Line 63 is coupled to a control potential or equivalent of an AGC source and to ground through resistor 82 so that a signal of proper strength will produce a potential across this resistor which is applied to capacitor 80 through resistor 83. Capacitor 67 connected between the junction of resistors 82, 83 to ground provides bypassing for the signal so that a direct current potential related to the strength of the received signal will be applied to the voltage sensitive capacitor 80. Accordingly, as a control potential is produced across resistor 82 the capacity of capacitor 80 increases thus decreasing the coupling between the first and second tuned circuits thereby reducing the signal transferred as described above in connection with the circuit of Fig. 1.

The embodiment shown in Fig. 3 with corresponding parts numbered the same as in Figs. 1 and 2, includes a pair of biased back to back diodes 90, 91 which are series connected between the first and second tuned circuits comprised respectively of elements 40—43 and 47—49. These tuned circuits are otherwise decoupled from one another and the control potential variable with signal level is developed across resistor 82 and applied from line 63 through resistor 83 to the interconnection of diodes 90, 91 so that as this potential increases the conductivity of these diodes decreases. Accordingly decreasing the signal transference between the first and second tuned circuits improves the intermodulation characteristics of the receiver as described above. The diode coupling can be fixed at a desired level in the uncontrolled condition by tapping the diodes down on coils 42 and 47.

This invention provides, therefore, a simple system for automatically reducing the tendency for intermodulation signals in a communication receiver. The system provides automatic response to signals of increased strength so that these signals are attenuated somewhat as applied to the receiver by circuits of increased selectivity. Accordingly, it is possible to improve the reception of signals of various strengths which may be closely spaced in frequency through use of the described receiver in which signal receiving characteristics thereof are dynamically varied in accordance with the level of the desired signal.

I claim:

1. A wave signal input system for coupling an antenna to a receiver including in combination, first and second tuned circuits having respective inductance portions and cores therefor, saturable core means air spaced from said cores of said inductance portions and providing critical coupling therebetween to establish a given selectivity of said tuned circuits, said saturable core means including a winding adapted to be energized for saturating the same upon application of a direct current control potential thereto to reduce said given selectivity, a source of direct current control potential related to the strength of signals translated by said system above a certain level, said source of potential being coupled to said winding for saturating said core means to reduce the coupling between said inductance portions and increase selectivity of said tuned circuits in accordance with strength of signals above said certain level.

2. A wave signal input system for a radio receiver including in combination, a pair of tuned circuits, one of said tuned circuits being adapted to be coupled through passive circuit means to an antenna, the other of said tuned circuits being coupled to a first stage of the receiver, voltage sensitive capacitor means intercoupling said tuned circuits and providing relatively low signal transference and high tuned circuit selectivity upon application of a control signal thereto and providing high signal transference and low tuned circuit selectivity in the absence of such a control signal, circuit means adapted to produce a control signal directly related to the level of a signal translated by said system, said circuit means being coupled to said voltage sensitive capacitor means to regulate signal transference between said tuned circuits and selectivity thereof according to the level of a translated signal.

3. A wave signal input system for a receiver including in combination, a pair of tuned circuits, one of said tuned circuits being adapted to be coupled through passive circuit means to an antenna, the other of said tuned circuits being coupled to a first stage of the receiver, a pair of diodes connected back to back and being the sole intercoupling for said tuned circuits, said diodes being subject to application of a bias potential for reducing the intercoupling between said tuned circuits and increasing the selectivity thereof, circuit means for developing a bias potential variable directly in accord with the level of a signal translated in said receiver, said circuit means being coupled to said diodes to reduce the coupling between said tuned circuits according to the level of a signal translated by said receiver.

4. In a radio receiver, a system for reducing intermodulation by automatically regulating the input attenuation and selectivity thereof including in combination, passive input means adapted to be coupled directly to an antenna, a first signal developing impedance coupled to said input means, a second signal developing impedance coupled to the receiver to apply signals thereto, both of said first and second signal developing impedances comprising a tuned circuit tunable to the frequency of a desired signal, voltage sensitive means providing critical coupling between said first and second signal developing impedances, said voltage sensitive means being subject to application of a control potential thereto to reduce the amount of coupling between said first and second impedances and the selectivity of said tuned circuit in accordance with the control potential applied, said voltage sensitive means providing signal coupling between said first and second impedances which is reduced as the control potential increases to increase the selectivity of said tuned circuit and attenuation of signals, and means connected to said voltage sensitive means for producing a control potential increasing with increase of signal strength at said input means whereby selectivity and attenuation of signals applied to the receiver are increased at high signal levels.

5. In a radio receiver, a system for reducing intermodulation by automatically regulating the input selectivity and sensitivity thereof including in combination, passive input means adapted to be coupled to an antenna, a first tuned circuit passively coupled to said input means, a second tuned circuit coupled to the receiver to apply signals thereto, voltage sensitive means providing the sole intercoupling between said first and second tuned circuits, said voltage sensitive means being subject to application of a control potential thereto to vary the signal coupling between said first and second tuned circuits and the selectivity thereof, said voltage sensitive means providing signal coupling which is reduced and selectivity which is increased as said control potential increases, and means connected to said voltage sensitive means for producing a control potential increasing with increase of signal strength at said input means whereby selectivity and attenuation of signal supplied to the receiver are increased at high signal levels.

6. In a radio receiver, a system for automatically regulating the input selectivity and attenuation thereof including in combination, a first tuned circuit adapted to be coupled to an antenna through a passive circuit, a second tuned circuit coupled to the receiver to supply signals thereto, said first and second tuned circuits having respective inductance coils and cores therefor, a further core portion in air-spaced relation with respect to said cores of said inductance coils and providing the sole coupling between said first and second tuned circuits, a winding disposed on said further core portion and adapted to be enrgized for saturating the same upon application of a direct current control potential thereto, the coupling provided by said further core portion being reduced in response to increase of said control potential for reducing the coupling between said first and second tuned circuits and increasing the selectivity thereof, and means connected to said winding for producing a control potential increasing with increase of signal strength as translated by said first and second tuned circuits whereby selectivity and attenuation of said system are automatically controlled in accordance with signal strength.

7. The system for reducing intermodulation as defined in claim 5 in which said voltage sensitive means provides critical coupling between said tuned circuits and said means for producing a control potential provides a delay so that the given control potential is produced only when input signals exceed a given level.

References Cited in the file of this patent

UNITED STATES PATENTS

| | | |
|---|---|---|
| 2,088,229 | Braden | July 27, 1937 |
| 2,142,038 | Bier | Dec. 27, 1938 |
| 2,145,561 | Toth et al. | Jan. 31, 1939 |
| 2,210,381 | Rechnitzer | Aug. 6, 1940 |
| 2,243,921 | Rust | June 3, 1941 |
| 2,255,645 | Bligh | Sept. 9, 1941 |
| 2,255,690 | Wheeler | Sept. 9, 1941 |
| 2,262,707 | Farrington | Nov. 11, 1941 |
| 2,302,893 | Van Roberts | Nov. 24, 1942 |
| 2,714,187 | Goodrich | July 26, 1955 |
| 2,849,603 | Sontheimer | Aug. 26, 1958 |

OTHER REFERENCES

Radiotron Designers Handbook, 4th ed., 1952, distributed in U.S.A. by RCA, Harrison, N.J.; page 945 cited.